United States Patent [19]

Perera

[11] 4,073,515
[45] Feb. 14, 1978

[54] ATTACHABLE PIPE TEE

[75] Inventor: Armand Perera, Bristol, Conn.

[73] Assignee: The Raymond Lee Organization, Inc., New York, N.Y.

[21] Appl. No.: 759,785

[22] Filed: Jan. 17, 1977

[51] Int. Cl.² .................................... F16L 41/00
[52] U.S. Cl. ................................ 285/158; 137/318; 285/197; 285/386
[58] Field of Search .............. 285/197, 198, 199, 354, 285/158, 386; 137/318, 15; 251/146, 145

[56] References Cited

U.S. PATENT DOCUMENTS

| | | | |
|---|---|---|---|
| 1,791,385 | 2/1931 | Skuttle | 285/197 X |
| 1,818,255 | 8/1931 | Hitchcock | 285/354 X |
| 2,608,989 | 9/1952 | McDonald | 137/318 |
| 2,618,511 | 11/1952 | Wahlin | 285/198 X |
| 3,240,227 | 3/1966 | Burkholder | 285/197 X |
| 3,355,794 | 12/1967 | Adams | 285/197 X |
| 3,635,503 | 1/1972 | Rafalski, Jr. | 285/197 |

FOREIGN PATENT DOCUMENTS

| | | | |
|---|---|---|---|
| 1,200,439 | 6/1959 | France | 285/197 |
| 1,305 of | 1914 | United Kingdom | 285/197 |

Primary Examiner—Thomas F. Callaghan
Attorney, Agent, or Firm—Howard I. Podell

[57] ABSTRACT

A pipe tee unit which may be mounted to a pipe for attachment of an extension tube to the pipe. The tee unit is formed of a pair of clamp members which are each formed with a circular concave recess of less than semi-circular section on their respective inner faces for clamping about a cylindrical pipe. One of the clamp members is externally fitted with a threaded nipple formed with a through hole for use in guiding a drill so as to cut a hole in a pipe clamped by the two members, when the two members are bolted together about a pipe. An extension tube fitted to a threaded collar is then fastened by the said collar to the nipple.

1 Claim, 3 Drawing Figures

U.S. Patent
Feb. 14, 1978
4,073,515
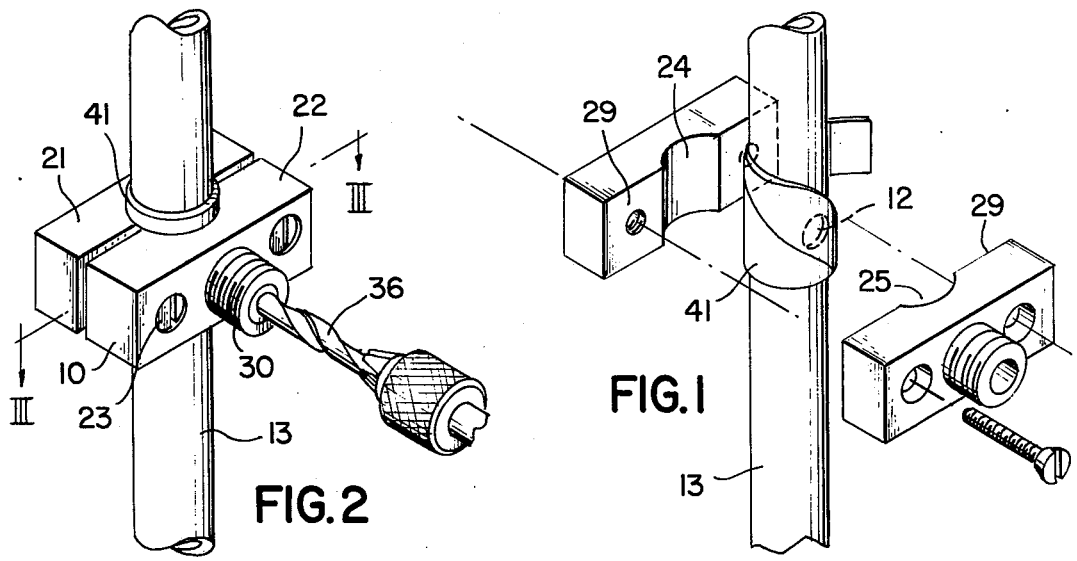
FIG.1
FIG.2
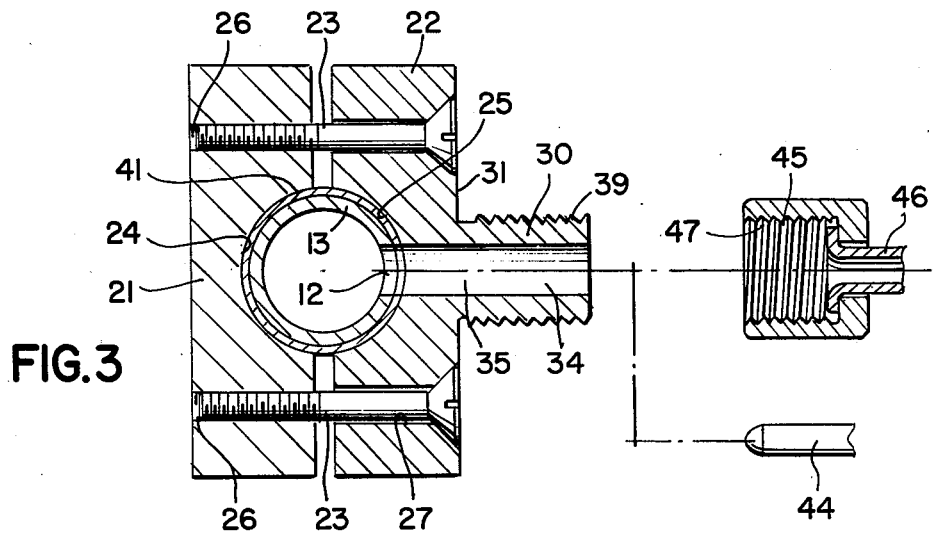
FIG.3

ATTACHABLE PIPE TEE

SUMMARY OF THE INVENTION

My invention is a pipe tee unit which may be mounted to a pipe for attachment of an extension tube to the pipe. The tee unit is formed of a pair of clamp members which are each formed with a circular concave recess of less than semi-circular section on their respective inner faces for clamping about a cylindrical pipe. One of the clamp members is externally fitted with a threaded nipple formed with a through hole for use in guiding a drill so as to cut a hole in a pipe clamped by the two members, when the two members are bolted together about a pipe. An extension tube fitted to a threaded collar is then fastened by the said collar to the nipple.

BRIEF DESCRIPTION OF THE DRAWINGS

The objects and features of the invention may be understood with reference to the following detailed description of an illustrative embodiment of the invention, taken together with the accompanying drawings in which:

FIG. 1 is an exploded perspective view of the invention;

FIG. 2 is a perspective view of the invention employed to drill a hole in a pipe; and FIG. 3 is an exploded sectional view of the invention employed as a pipe tee.

DESCRIPTION OF THE PREFERRED EMBODIMENT

Turning now descriptively to the drawings, in which similar reference characters denote similar elements throughout the several views, FIGS. 1–3 illustrate the combination drill peg and pipe tee 10 which is initially employed to drill a hole 12 in a pipe 13 and subsequently employed to serve as a pipe tee to which an extension tube 46 may be fastened.

Pipe tee 10 consists of two clamp members 21, 22 detachably joined together by screws 23.

Each clamp member 21, 22 is formed with a concave recess 24, 25 respectively on its inner face 29 of a circular section of a size to engage against a cylindrical wall of pipe 13, with clamp member 21 formed with a pair of threaded holes 26 aligned axially when assembled with a pair of through holes 27 for mounting of clamp screws 23 to join members 21 and 22.

A threaded nipple 30 extends from the external face 31 of clamp member 22 with a through axial hole 34 located in nipple 34 that extends through clamp member 22 to the inner face of concave recess 25, with said hole 34 serving as a guide for a drill 36 to drill a hole 12 in clamped pipe 13.

After hole 12 has been so drilled, the clamp members are detached from the pipe and the edges of the hole filed smooth. A layer of flexible sealing tape 41 is wrapped about the pipe and hole 12 and the clamp members reassembled with hole 34 of the nipple 30 aligned with hole 12 in the pipe by inserting a rod 44 through hole 34 and punching through the tape 41.

Rod 44 is removed and an extension tube 46 fitted with a rotatable collar 45 is fastened to nipple 30 to form a permanent connection of tube 46 to pipe 13, with collar 45 formed with internal threads 47 of a size to matingly engage external threads 39 of nipple 30.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A kit for joining an extension tube to a pipe comprising a pair of clamp members, each formed with a curved recess on an inner face of a shape to engage a cylindrical pipe wall, attachment means to fasten both clamp members about a pipe, with one of said clamp members formed with a threaded nipple that extends from an external face of said clamp member, said nipple formed with a through circular hole of smooth bore that extends to the face of the curved recess, with a collar internally threaded to engage the thread of the nipple, said collar adaptable for fastening a length of tube to said nipple, together with a length of solid flat sealing tape adaptable for wrapping about the outer wall of the pipe and between said pipe wall and the recess of each clamp member, when the clamp members are mounted about a section of said pipe, with the sealing tape fixed between the clamp members and said pipe, such that the pipe and the wrapped tape may be pierced simultaneously by a tool inserted into the axial hole of the nipple.

* * * * *